United States Patent [19]
Usui

[11] Patent Number: 5,081,326
[45] Date of Patent: Jan. 14, 1992

[54] ELECTROCONDUCTIVE COMPOSITE TUBE ASSEMBLY

[75] Inventor: Masayoshi Usui, Numazu, Japan

[73] Assignee: Usui Kokusai Sangyo Kaisha Limited, Japan

[21] Appl. No.: 563,496

[22] Filed: Aug. 6, 1990

[30] Foreign Application Priority Data

Aug. 7, 1989 [JP] Japan ................... 1-204229

[51] Int. Cl.$^5$ ............... H01B 17/00; H05F 3/00; F16L 11/12
[52] U.S. Cl. .................... 174/47; 138/137; 138/141; 174/DIG. 8; 361/215
[58] Field of Search ............ 174/47, DIG. 8; 361/215; 138/125, 126, 127, 137, 141, DIG. 3

[56] References Cited

U.S. PATENT DOCUMENTS

| | | | |
|---|---|---|---|
| 3,266,527 | 8/1966 | Ross | 138/125 |
| 3,828,112 | 8/1974 | Johansen et al. | 174/47 |
| 4,156,127 | 5/1979 | Sako et al. | 174/47 X |
| 4,800,109 | 1/1989 | Washizu | 138/141 X |

*Primary Examiner*—Morris H. Nimmo
*Attorney, Agent, or Firm*—Anthony J. Casella; Gerald E. Hespos

[57] ABSTRACT

An electroconductive composite tube assembly is provided. The assembly includes a metal end member having at least one cylindrical wall. A tube main body of PTFE and having an outer circumferential surface is further provided. The outer circumferential surface of the tube main body is disposed in engagement with an inner circumferential surface of the cylindrical wall of the metal end member. An electroconductive tube formed from a heat-shrinkable resin is disposed over the cylindrical wall of the metal end member and over the outer circumferential surface of the tube main body. The electroconductive tube is heat-shrunk into laminated engagement with both the cylindrical wall of the metal end member and with the outer circumferential surface of the tube main body to enable efficient grounding of the electrostatic charges developed in the composite tube.

6 Claims, 1 Drawing Sheet

ELECTROCONDUCTIVE COMPOSITE TUBE ASSEMBLY

BACKGROUND OF THE INVENTION

1. Field of the Invention

The present invention concerns a composite tube made of synthetic resin having a relatively small diameter of not greater than about 20 mm which is generally disposed, for example, as oil or air supplying lines in automobiles or various kinds of mechanical apparatus.

2. Description of the Prior Art

Composite tubes made of synthetic resin of the aforementioned type are for instance made of polytetrafluoroethylene (PTFE). However when the tube is put to use, rubbing is caused between the outer circumference of the tube and other parts adjacent therewith or frictional contact is caused between the tube and an inner fluid passing therethrough due to vibrations applied to the tube per se. Further, the fluctuation of fluid pressure always repeated in the inner fluid, induces electrostatic charges to the tube itself and the circumferential wall of the tube is damaged during long time use due to sparks generated by the electrostatic charges. Accordingly, there have been adopted countermeasures for removing electrostatic charges. For example, a carbon powder has been mixed directly into the tube material thereby providing the tube with electroconductivity (not illustrated). Alternatively, as shown in FIG. 6, an inner circumference 11' of a tube main body 11 made of a PTFE is laminated with a resin tube 12 rendered electroconductive by the mixing of a carbon powder 13. In the figure, reference numeral 14 denotes a braided member made of metal wires and covered on the outer circumferential surface of the tube main body 11.

Such prior art, however, requires the use of a joint made of electroconductive and chemical resistant material in contact with the tube main body 11 and in relation with the grounding mechanism at the end of the tube. This complicates the structure, increases the cost, lowers the strength of the tube to deteriorate the pressure resistance, and results in troublesome disposing operation. In the later means, since a great amount of the carbon powder is directly exposed to chamicals, in a case where the fluid incorporated in the tube comprises chemicals, the chemical resistance of the tube is deteriorated to restrict the application use. Further, when the resin tube 12 is inserted and laminated (at 13) on the inner circumferential surface 11' of the tube main body 11 upon manufacture, the adhesion at the inner circumferential surface of the tube main body 11 made of the (PTFE) is poor. Therefore the resin tube 12 tends to be peeled off easily and this remarkably makes the production complicated so as to increase the product cost, etc.

SUMMARY OF THE INVENTION

The present invention has been accomplished in view of the foregoing problems in the prior art. It therefore is an object of the present invention to provide a composite tube made of a synthetic resin capable of providing a sufficient chemical resistance with a PTFE constituting the circumferential surface of a flow channel. The invention enables extending the application use of the tube, extremely facilitating the production of the composite tube, improving the strength and enabling a simple grounding mechanism by means of a usual bracket, etc. This latter object is achieved by the electroconduction on the side of the outer circumferential surface and applying coating lamination only at a required portion of the tube main body as desired.

The foregoing objects of the present invention can be attained by a composite tube made of synthetic resin, in which an electroconductive heat-shrinkable resin tube mixed with a carbon powder is coated and laminated in a shrinkable manner to the outer circumferential surface of a tube main body made of a polytetrafluoroethylene material, in which the heat-shrinkable resin tube is put over an end metal member, and a braided member made of fine metal wires is further fit tightly over the outer circumferential surface of the heat-shrinkable resin tube coated in lamination.

Since the present invention is constituted as described above, sufficient chemical resistance can be provided even for a fluid, such as chemicals, owing to the circumferential surface of a flow channel of the tube main body made of polytetrafluoroethylene material on the inner circumferential side and the application use of the tube can be extended.

In addition, the heat-shrinkable resin tube situated on the outer circumferential surface can provide electroconduction, facilitate the grounding mechanism, improve the strength of the tube and prevent the occurrence of sparks by effectively removing electrostatic charges. This eliminates damage to the tube and, further, can extremely facilitate the production of the composite tube, as well as the resin tube which can be covered in lamination partially only at required portions of the tube main body as desired.

DETAILED DESCRIPTION OF THE PREFERRED EMBODIMENTS

Figure 1:
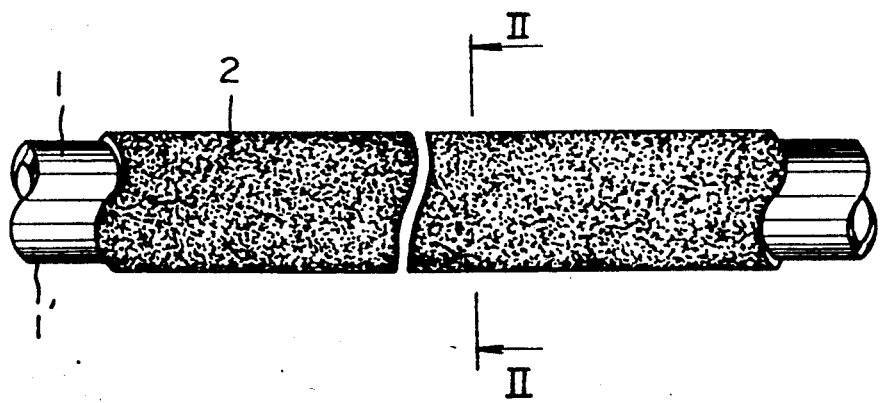
FIG. 1 is a plan view of a composite tube made of synthetic resin for one embodiment according to the present invention.
Figure 3:
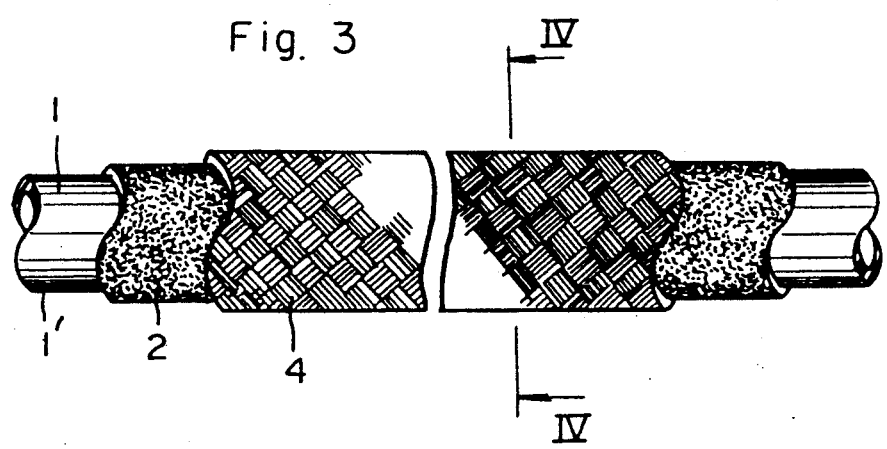
FIG. 3 is a plan view for another embodiment according to the present invention.
Figure 2:
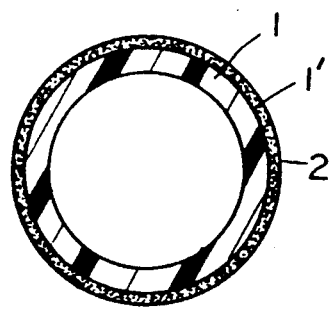
FIG. 2 is an enlarged cross sectional view taken along line II—II in FIG. 1.
Figure 4:
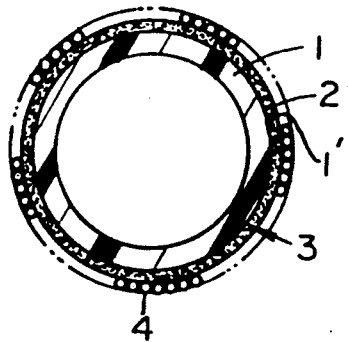
FIG. 4 is an enlarged cross sectional view taken along line IV—IV in FIG. 3.
Figure 6:
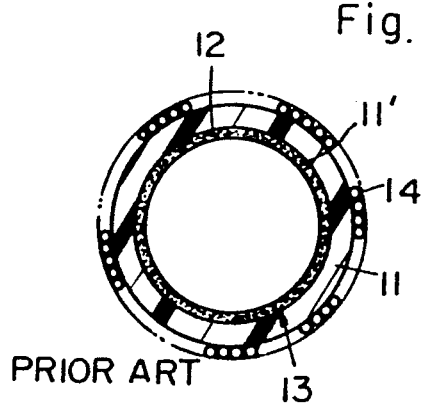
FIG. 6 is an enlarged transversal cross sectional view of a composite tube made of synthetic resin in the prior art.

In FIG. 1 through FIG. 5, a tube main body 1 made of polytetrafluoroethylene (hereinafter sometimes referred to also as PTFE) is coated in lamination (at 3) at the outer circumferential surface thereof with an electroconductive heat-shrinkable resin tube 2 mixed with a carbon powder of such a fine grain size as capable of conducting electrostatic charges of a minute electric current although at a super high voltage. For preparing the composite tube, the resin tube 2 put over the tube main body 1 is caused to shrink by the application of a proper heating treatment. A braided member 4 made of fine metal wires such as of stainless steel is disposed as necessary as shown in FIG. 3 and FIG. 4, which is tightly fit over the outer circumferential surface of the resin tube 2 when the composite tube is disposed as a tube, for example, for high pressure application use.

Figure 5:
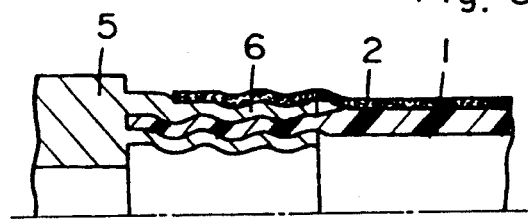
FIG. 5 is a cross sectional view for one-half of a still further embodiment of the present invention.

Further, according to the present invention, similar effects to that in the previous embodiment can be obtained by also putting the end of the tube main body 1 between cylindrical walls 6 of an end metal member 5 and depositing the resin tube 2 to the outer circumferential surface of the cylindrical wall 6 as shown in FIG. 5 for connecting the end of the tube main body 1 with the end metal member 5.

As has been described above, in the composite tube made of synthetic resin according to the present invention, the tube main body 1 made of the PTFE material on the side of the inner circumference constituting the circumferential surface for the flow channel can provide a sufficient chemical resistance to extend the application use of the composite tube. This can further give high strength and high voltage withstanding performance to the tube, as well as the heat-shrinkable resin tube 2 mixed with the fine carbon powder situated on the outer circumferential surface 1' can effectively remove electrostatic charges to prevent the occurrence of electric sparks. This eliminates the worry of damage to the circumferential wall surface of the tube, enables provision of the grounding mechanism and, further, extremely facilitates the production of the composite tube. In addition, the resin tube can be covered in lamination (at 3) partially only at required portions of the tube main body 1 as desired, to reduce the production cost and improve the enduring reliability. Thus, the composite tube made of synthetic resin according to the present invention is extremely useful.

I claim:

1. An electroconductive composite tube assembly comprising a metallic end member including a generally cylindrical wall defining opposed inner and outer circumferential surfaces, a tube main body made of polytetrafluoroethylene having an outer circumferential surface disposed in face to face contact with the inner circumferential surface of the generally cylindrical wall of the metal end member, and an electroconductive tube formed from a heat shrinkable resin mixed with a carbon material disposed over the outer surface of the cylindrical wall of the metal end member and over the outer circumferential surface of said tube main body, said electroconductive heat-shrinkable tube being heat-shrunk to closely engage in lamination the outer circumferential surface of the cylindrical wall of the metal end member and the outer circumferential surface of said tube main body, whereby the heat-shrunk lamination of the electroconductive tube to the tube main body and the metal end member enables efficient grounding of electrostatic charges induced in the tube.

2. A composite tube as defined in claim 1, wherein a braided member made of fine metal wires extends tightly over the outer circumferential surface of the heat-shrinkable resin tube.

3. A composite tube as defined in claim 2, wherein the metal wires are made of stainless steel.

4. A composite tube as defined in claim 1 wherein the generally cylindrical wall of said metal end member is corrugated, and wherein the electroconductive tube is heat-shrunk to conform to the corrugations in the generally cylindrical wall of the metal end member.

5. A composite tube as defined in claim 1 wherein the generally cylindrical wall of the metal end member defines a generally cylindrical outer wall, and wherein the metal end member further comprises a generally cylindrical inner wall concentric with and spaced inwardly from the generally cylindrical outer wall, a portion of the tube main body being disposed intermediate the inner and outer cylindrical walls of the metal end member.

6. A composite tube as defined in claim 5 wherein the inner and outer walls of the metal end member are corrugated, the electroconductive tube being heat-shrunk to conform to the corrugations of the outer cylindrical wall of the metal end member.

* * * * *